Dec. 17, 1968     F. L. SIMPSON ET AL     3,416,297
COTTON HARVESTER
Filed Oct. 19, 1966
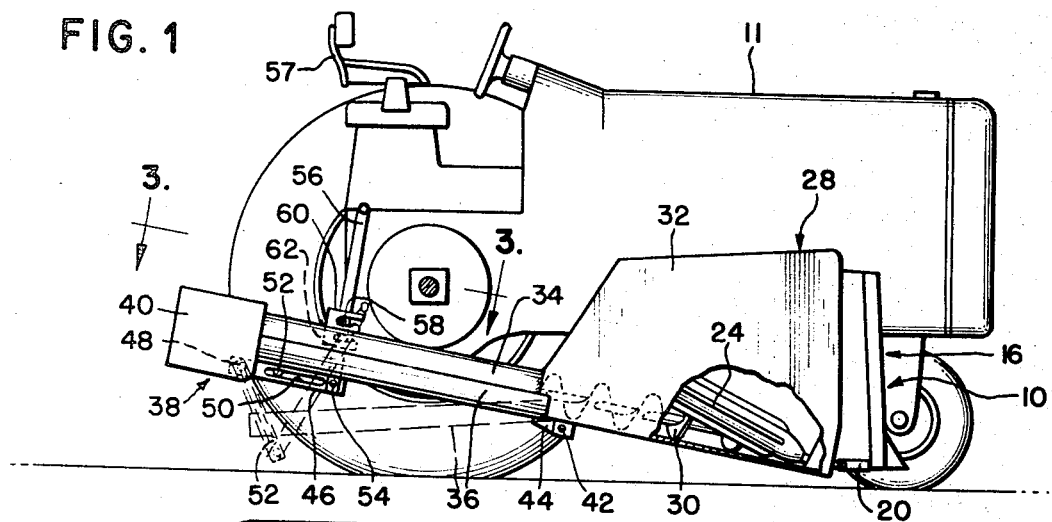
FIG. 1
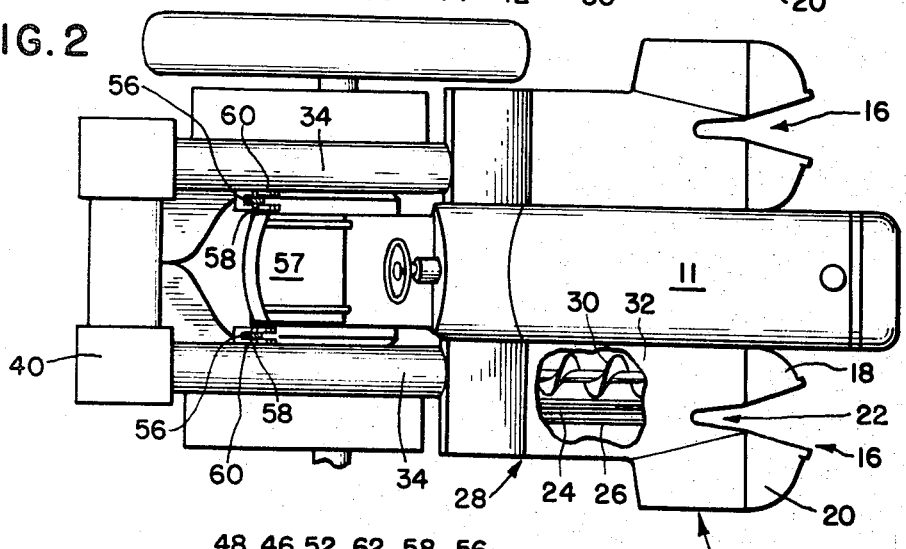
FIG. 2
FIG. 3
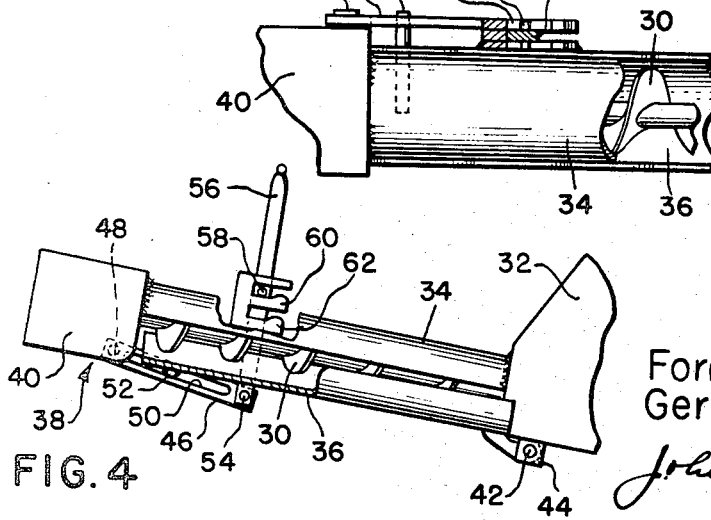
FIG. 4
Inventors
Forrest L. Simpson
Gerald L. Robertson
John J. Kowalik
Attorney United States Patent Office 3,416,297
Patented Dec. 17, 1968

3,416,297
COTTON HARVESTER
Forrest L. Simpson and Gerald L. Robertson, Memphis, Tenn., assignors to International Harvester Company, Chicago, Ill., a corporation of Delaware
Filed Oct. 19, 1966, Ser. No. 587,819
10 Claims. (Cl. 56—33)

The present invention relates to a cotton harvester and more particularly to a cotton stripper.

The invention has to do specifically with a special construction of conveyor means for conveying material removed from the cotton plants by the stripper means. Such conveyor usually includes an auger operating in an enclosing housing.

The stripper and conveyor must pick up from closely adjacent the ground in order to assure picking all of the cotton from the plants, but in such position they incidentally also pick up foreign material such as rocks and clods. Such foreign material tends to accumulate in the conveyor housing, eventually preventing the auger from operating, and it is necessary for the operator to manually dislodge such foreign material. This is extremely difficult in many cases because of the general inaccessability to the interior of the housing.

A broad object of the present invention is to provide a construction of conveyor for use in a cotton harvester of the foregoing general character which includes an arrangement providing easy access into the interior of such conveyor housing.

A more specific object is to provide a conveyor of the character referred to in which the conveyor housing is provided with a removable section and upon its removal the interior of the housing is rendered readily accessible to the operator for quick cleaning of all foreign material therefrom.

A still more specific object is to provide in a conveyor structure of the character referred to, such a removable housing section adjacent the delivery end of the conveyor which renders the accessibility to the conveyor more effective because of the fact that the foreign material tends to accumulate to a greater extent adjacent the delivery end than at the leading end, and hence exposure of the interior of the housing at this location enables quick removal of the greater part of any foreign material that has accumulated.

Still another object is to provide, in a conveyor structure of the foregoing general character a housing having a section that is not only removable, but alternatively positionable to a partially open position whereby to enable continuous dropping out of foreign material to prevent the accumulation thereof.

A still further object is to provide, in a conveyor structure of the foregoing character, a removable housing section that is easily manipulable and movable to partially open, or fully open, position by manual actuating means adjacent the driver's position on the implement.

Other objects and advantages of the invention will appear from the following detail description taken in conjunction with the accompanying drawings in which—

FIGURE 1 is a side elevational view with portions broken away of certain components of a cotton harvester embodying the features of the present invention, shown in conjunction with a portion of a tractor;

FIGURE 2 is a plan view with portions broken away of the cotton harvester, showing only a small number of the details thereof and otherwise in only outline shape;

FIGURE 3 is a view taken at line 3—3 of FIGURE 1; and

FIGURE 4 is a side elevational view with portions broken away of certain elements of the apparatus, oriented according to FIGURE 1 and showing the removable section in partially open position.

Referring now in detail to the accompanying drawings, FIGURE 1 shows a portion of a cotton stripper 10 mounted to a tractor 11. The cotton stripper in itself is of known kind and may be generally of the kind disclosed and claimed in United States Patent No. 2,677,226, issued May 4, 1954, to Hyman. Such a cotton stripper is adapted for the final harvesting operation and strips all of the bolls from the plants, and incidentally other materials including portions of the plants such as leaves, branches, twigs, etc. Such a stripper may include two stripper units 16 (FIGURE 2) and since both are identical, or symmetrical, reference will be made to only one in the following description. Each stripper unit 16 (see the lower unit of FIGURE 2) includes divided components 18, 20 defining a passageway 22 therebetween for the passage of the cotton plants in the normal operation of the implement, the implement moving to the right as viewed in FIGURES 1 and 2. Mounted in the stripper unit 16 is a stripper roll 24 disposed in or adjacent the path of the cotton plants moving through the passageway and operating against a reaction element 26 whereby it strips the cotton bolls from the plants.

FIGURE 1 shows the general inclination of the stripper roll 24, its forward end being immediately adjacent the lower surface of the stripper unit so as to be closely adjacent the ground to pick all of the bolls from the plants. As the plants pass through the passage, all portions of them, from bottom to top, are encountered by the inclined stripper roll as is of course understood.

The stripper roll after so stripping the cotton bolls throws or moves them laterally into a conveyor means indicated generally at 28, the stripper roll operating in the appropriate direction, as clockwise as viewed on the right in FIGURE 2. The conveyor 28 includes an auger 30 operating in an enclosing housing 32 which extends from adjacent the front end of the stripper unit to adjacent an afterpart of the implement, and preferably is inclined upwardly rearwardly. The specific arrangement of the stripper roll and conveyor means may be as desired, such as disclosed in the United States patent referred to above, and need not be described further in detail herein, except the specific construction of the conveyor housing as will be described in detail hereinbelow. The stripper roll and the conveyor both are mounted for vertical movements with the stripper unit 16, in the adjusting movements of the latter, the unit including a lowermost position in which it effectively rides on the ground and in such position the lowermost end of both the stripper roll and the conveyor are closely adjacent the ground. This positioning is desirous so as to reach all of the bolls on the cotton plants some of which are closely adjacent the ground, but in such position of those elements, picking up foreign material cannot be avoided. This foreign material may consist of rocks, clods, and other items which are not readily conveyed by the auger and tend to accumulate in the conveyor housing causing stoppage of the conveyor.

The afterpart of the conveyor housing 32 is preferably entirely enclosed as shown in FIGURES 1, 3, and 4. This portion of the housing includes an upper fixed part 34 and in the present instance a lower effectively removable section 36, both of which may be substantially semi-cylindrical in extent. The conveyor has an outlet or terminal end 38 and may include a section 40 forming an outlet from the conveyor, or a transition component for transferring the conveyed cotton to another conveyor.

The lower section 36 is pivoted at its forward and lower end at 42 on a fixed portion 44 of the unit 16. At the rear end of the conveyor, a lever arm 46 is pivoted at 48 on a fixed portion of the implement such as the section 40. This lever arm is provided with an elongated slot 50 receiving a pin 52 on the rear or swinging end of the housing section 36. Pivoted at 54 in the swinging end of the lever arm 46 is a hand lever 56 which extends upwardly to a position adjacent the operator's seat 57 on the tractor, and upon manipulation of the lever by the operator, the housing section 36 can be moved between closed and opened positions. Suitable means is provided for locking the hand lever 56 in certain positions such as a pin or stud 58 in the lever engageable with lock means 60 at a suitable location on a fixed portion of the implement, such as on the upper housing section 34 itself. When the lever is raised to the upper position in which the section 36 is closed, the lever may be swung forwardly to bring the pin 58 into locking engagement with the lock means 60. Additional lock means 62 may be also provided at a position below the lock means 60, engageable with the pin 58 for locking the hand lever 56 at a lower position (FIGURE 4) for partially opening the removable section 36.

The foreign materials upon dropping into the conveyor are moved or conveyed rearwardly, along with the cotton, but they accumulate in the conveyor and cause jamming and stopping of the auger. This accumulation increases gradually toward the rear end of the conveyor and reaches its greatest condition at the rear end, where the housing entirely surrounds the auger. Heretofore when such jamming and stopping occurred, and since the jamming is most intense in the rear portion where the housing surrounds the auger, it was difficult to reach into the interior of the housing and remove the jammed foreign material. In the use of the present construction, the operator moves the hand lever 56 out of its locked position and releases it, allowing it to drop to the dot-dash line position (FIGURE 1), the removable section 36 also dropping to its lowermost position shown in dot-dash lines. This exposes the interior of the conveyor housing and the operator can easily reach thereinto and remove any material that has been causing the stopping of the conveyor. Much of this material will fall with the removable section 36 in lowering the lattter, and it can be merely swept out of that section by the hand. Also the auger may be rotated with the section open, to clean out, or assist in cleaning out, the housing. Upon thus cleaning the conveyor, the section may be moved again to its closed position by raising the hand lever 56 and locking it in full uppermost position, in conjunction with the lock means 60. A safety feature is provided in eliminating damage to the machine in its forward movement if the operator should inadvertently neglect to close and lock the section.

It is also possible to position the removable section 36 at a position below its full closed position, but not fully open. Such a position is shown in FIGURE 4 and to place it in that position, the hand lever 56 is swung rearwardly to release the pin 58 from the lock means 60, and lowered to let the pin engage the lock means 62. In this position the rear end of the removable section 36 is opened below the section 40 only a small amount and this will permit most of the heavier foreign material to escape and drop out of the rear end of the section 36 with a minimum loss of cotton bolls from this source. The cotton bolls tend to cling together and follow in a continuous stream over the opening in the housing, providing a novel method of conveying and cleaning, with the advantage gained by the continuous ejection of the foreign material.

The provision of the swinging lever arm 46 provides a mechanical advantage in moving the housing section 36 to closed position, the pin 52 on the housing section being closer to the fulcrum 48 than the pivot axis 54 where the force is applied.

While we have disclosed herein a certain preferred form of the invention, it will be understood that changes may be made therein within the spirit and scope of the appended claims.

We claim:

1. In a cotton harvester of the character having harvesting means for removing bolls from the plants and having a leading end closely adjacent the ground, conveyor means adjacent the harvesting means and also having a leading end closely adjacent the ground, the bolls removing means having the effect of incidentally lifting foreign material from the ground and depositing it in the conveyor means, the conveyor means including a housing and a transfer device operative therein, and the conveyor means being operative for conveying the cotton bolls and such foreign material toward a delivery end of the conveyor means, the combination comprising, a section of the conveyor housing adjacent its delivery end being separable for exposing the interior of the housing whereby to enable removal of accumulated and congested foreign material in the housing.

2. The invention according to claim 1 wherein the conveyor housing at its delivery end is undisposed with respect to said transfer device, the separable section of the housing constitutes a lower portion thereof whereby upon separation of the section, the foreign material tends to drop from the interior of the housing and from the transfer device, and the opening provided by the separable section enabling operator access into the interior of the housing.

3. The invention according to claim 2 wherein said separable section approximates one half of the periphery of the conveyor housing, and is hinged at one end and swingable downwardly at its other end for so exposing the interior of the housing.

4. The invention according to claim 3 wherein the cotton harvester is adapted for mounting to a tractor having a driver's station with the rear end of the separable section adjacent that driver's station, and including lever means accessible from the driver's station for moving said separable housing section between closed and open positions.

5. The invention according to claim 4 wherein said separable section is pivoted at its front end, the lever means includes a lever arm pivoted to a fixed portion of the harvester at a position adjacent the rear end of the removable section, operating interconnection is established between the lever arm and the separable section at a point adjacent the rear end of the separable section and adjacent the pivot axis of the lever arm, the lever means also includes a hand lever connected with the swinging end of the lever arm and reaching to a position adjacent said driver's station, means limiting the separable section to a lowermost open position, and manually releaseable lock means for locking the hand lever in a position of full closure of the separable housing section.

6. The invention according to claim 2 and including a plurality of lock means for releaseably locking said separable section selectively in positions in which it is in partially open position, and fully open position.

7. The invention according to claim 2 wherein the transfer device is operable with the separable section in separated position, whereby the consequent movement of the transfer device operates to agitate the foreign material and thereby discharge it from the housing.

8. The invention according to claim 1 wherein the conveyor leads upwardly rearwardly from its low-point front end to a rear delivery end elevated from the ground, and the separable section is disposed on the under side of the conveyor, whereby to facilitate removal of the foreign material from the housing.

9. A self propelled cotton harvester unit having a harvesting portion for harvesting cotton which also lifts incidental foreign material, an operator's station, conveyor means for receiving the cotton and the incidental foreign material from said harvesting portion and having a foreign material discharge section with means operative by the operator of the unit while the unit is operated in the field and the operator is at said station.

10. The invention according to claim 9 wherein the discharge section includes a closure element movable by gravity to open position, and hand manipulable means is connected with the closure element and extends to a position closely adjacent the operator's station.

References Cited

UNITED STATES PATENTS

| 2,677,226 | 5/1954 | Hyman | 56—33 XR |
| 2,691,861 | 10/1954 | Lock et al. | 56—33 |
| 2,825,197 | 3/1958 | Smith | 56—33 |
| 2,831,565 | 4/1958 | Hensley | 198—82 |
| 3,015,963 | 1/1962 | Kappelmann et al. | 56—33 |
| 3,123,963 | 3/1964 | Horton et al. | 56—33 |

RUSSELL R. KINSEY, *Primary Examiner.*